United States Patent [19]

Behle

[11] 4,447,039

[45] May 8, 1984

[54] BOTTOM OPERABLE TANK CAR VALVE HAVING EXTERNAL ROTATION STOP

[75] Inventor: Gunter R. Behle, St. Peters, Mo.

[73] Assignee: ACF Industries, Incorporated, New York, N.Y.

[21] Appl. No.: 456,645

[22] Filed: Jan. 10, 1983

Related U.S. Application Data

[63] Continuation of Ser. No. 215,917, Dec. 12, 1980.

[51] Int. Cl.³ .............................................. F16K 51/00
[52] U.S. Cl. ..................................... 251/144; 251/266; 251/268; 251/287
[58] Field of Search ................. 251/144, 266, 268, 287

[56] References Cited

U.S. PATENT DOCUMENTS

| | | | |
|---|---|---|---|
| 1,110,731 | 9/1914 | Walp | 251/268 |
| 1,976,796 | 10/1934 | Milner | 251/266 |
| 4,141,535 | 2/1979 | Reesly et al. | 251/144 |
| 4,234,158 | 11/1980 | Rollins et al. | 251/144 |

Primary Examiner—A. Michael Chambers
Attorney, Agent, or Firm—Henry W. Cummings

[57] ABSTRACT

To provide a railway tank car mounting flange which does not extend more than one (1) inch below the tank bottom, fixed stops to prevent rotation of the valve closure during movement between open and closed positions, and fixed stops which determine the amount of travel of the valve closure between open and closed positions are located within the tank. The valve closure is provided with outwardly extending stops which engage the fixed stops within the tank. Preferably the fixed stops extend inwardly and upwardly from the mounting flange. Preferably the valve closure is bench assembled onto a removable valve seat and is installed into the tank from the bottom, avoiding the need for a workman to be located within the tank during installation.

35 Claims, 6 Drawing Figures

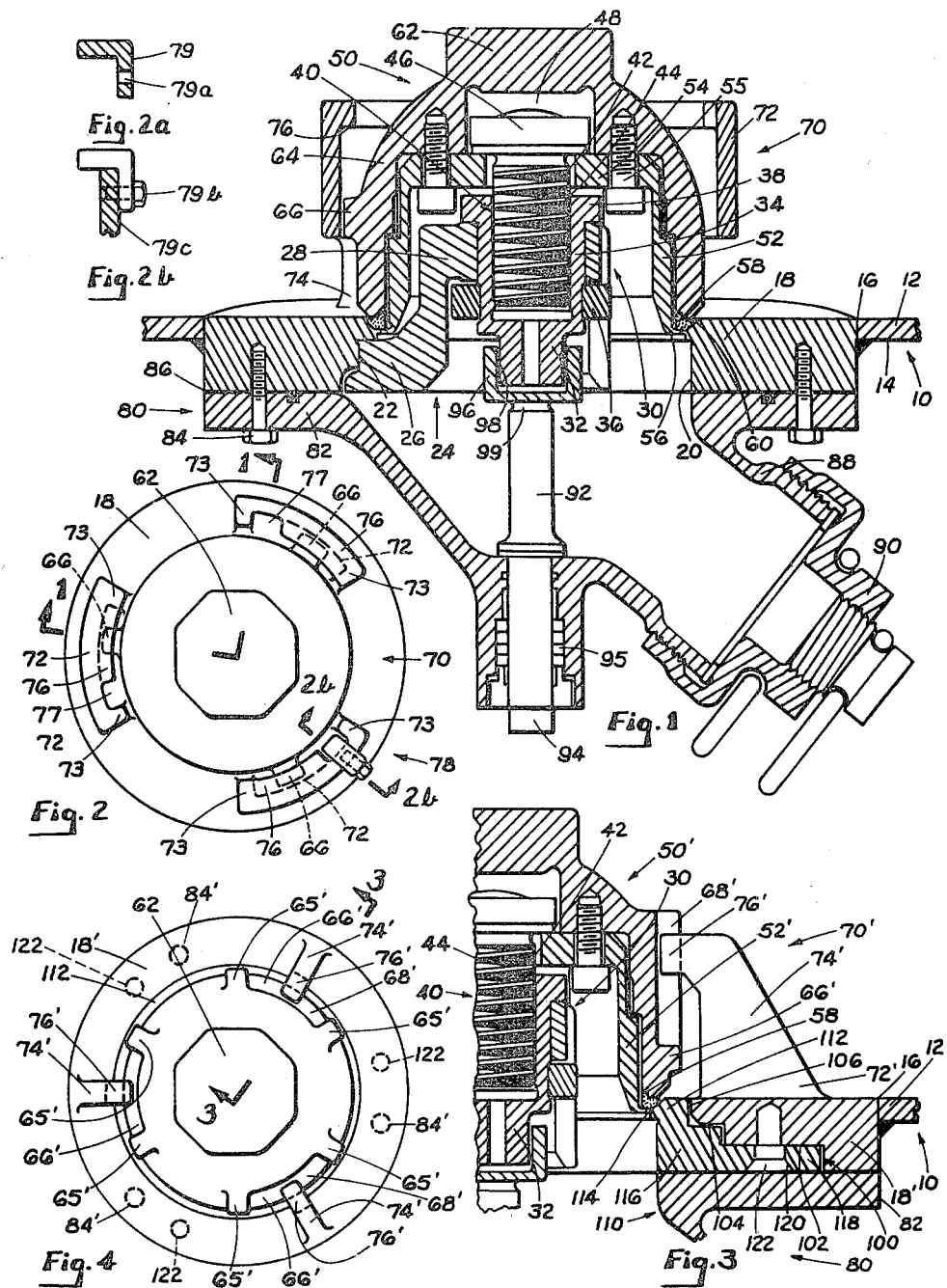

BOTTOM OPERABLE TANK CAR VALVE HAVING EXTERNAL ROTATION STOP

This is a continuation, of application Ser. No. 215,917, filed Dec. 12, 1980.

BACKGROUND OF THE INVENTION

In U.S. Pat. No. 3,981,481 granted Sept. 21, 1976, filed Oct. 8, 1974, a railway tank car bottom outlet valve assembly is disclosed in which the outlet chamber and a portion of a bottom operator for the valve closure drop off upon impact to the outlet chamber. In FIGS. 5-18 of this patent, movement of the valve closure between open and closed positions requires that a depending portion of the valve closure engage a retainer or spider to prevent rotation of the valve closure and allow the valve closure to move between open and closed positions.

While the construction shown in this patent represented a significant advance in the art in providing an outlet chamber which would shear off upon impact and prevent the lading from escaping during such an impact to the outlet chamber, the relatively thick mounting flange required in this construction necessary to mount both the valve seat and the spider or retainer to prevent rotation of the valve closure, necessitated a mounting flange which extends more than one (1) inch below the bottom surface of the tank bottom.

AAR and DOT regulations concerning projections extending below the tank bottom prohibit the mounting flange from extending more than one (1) inch below the tank bottom without additional shear-off protection.

Another problem with the construction illustrated in the '481 patent is that the projections extending downwardly from the valve closure to prevent rotation of the valve closure also function to stop vertical movement of the valve closure in the full open position. In order to have satisfactory unloading rates, the amount of travel of the valve closure and the depending extensions must be of the order of 1½-2 inches. If these valve closure extensions were to be reduced in vertical extent sufficient to have a mounting flange extend no more than one (1) inch below the tank bottom, the amount of available travel of the extensions would be less than one (1) inch. This would result in too low lading unloading rates and loading rates for commercial acceptance.

It is unpleasant and to some extent a safety hazard for workmen to be located within the tank during installation.

SUMMARY OF THE INVENTION

The object of the present invention is to provide a tank car bottom operable valve assembly in which the tank mounting flange does not extend below the lower external surface of the tank bottom in excess of one inch.

Another object of the present invention is to provide a tank car bottom outlet valve assembly which can be installed from the bottom without a workman having to be inside the tank during installation.

In accordance with the present invention, in order to provide a tank car mounting flange which does not extend more than one inch below the tank bottom, stop means to prevent rotation of the valve closure during movement between open and closed positions and stop means which determine the amount of travel of the valve closure between open and closed positions are located within the tank. The valve closure is provided with outwardly extending stop means which engage the fixed stop means in the tank. Preferably the fixed stop means extend inwardly and upwardly from the mounting flange.

IN THE DRAWINGS

FIG. 1 is a vertical sectional view of one embodiment of the valve closure assembly of the present invention looking in the direction of the arrows along line 1—1 in FIG. 2.

FIG. 2 is a plan view of FIG. 1.

FIG. 2a is a detail view of a stop opening closure member.

FIG. 2b is a sectional view looking in the direction of the arrows along the line 2b—2b in FIG. 4 showing the opening closure member in place.

FIG. 3 is a partial vertical sectional view of an alternative construction of the present invention looking in the direction of the arrows along the line 3—3 in FIG. 4.

FIG. 4 is a plan view of the embodiment shown in FIG. 3.

DESCRIPTION OF PREFERRED EMBODIMENTS

In accordance with the present invention, a railway tank car 10 includes a tank bottom 12 having a lower external surface 14. An opening 16 is provided in the tank bottom and a mounting flange 18 which does not extend below the lower external surface of the tank bottom in excess of one (1) inch is welded into the opening 16.

The mounting flange 18 includes an opening 20 for lading to exit through. The opening is provided with a stepped contour 22 at selected locations about the periphery of the opening 20 and which receives a retainer indicated generally at 24 including a lower portion 26 and an upper portion 28 which engages an operator indicated generally at 30. For example, this retainer may be provided by three (3) retainer webs 26. See U.S. Pat. No. 4,198,032.

Operator 30 includes a lower connection portion 32 and a threaded internal surface 34. Retainer portion 28 is held in place with a collar 36 and an outwardly extending portion 38 of the operator 30. The internal threads 34 of the operator 30 engage a depending closure operator indicated generally at 40 including external threads 42 located on a shank portion 44, and a top portion 46 located in an opening 48 in a valve closure member 50. Top portion 46 is held in place with a valve closure depending member 52 having an upper horizontal portion 54 which receives fasteners 55 extending into the closure 50, and a lower portion 56 which holds in place a seal 58 which engages a tapered valve seat 60 located on the mounting flange 18. Valve closure 50 includes a dome portion 62 of hexagon configuration and a body portion 64 having a plurality of outwardly extending stops 66 (FIG. 2).

One or more stop members indicated generally at 70 are located within the tank 10. Stop members 70 include a body portion 72 which is supported by a base portion 74 which is integral with the mounting flange 18. Body portion 72 is provided with a plurality of stop lugs 76 at locations above the lugs 66 on the valve closure. Stop openings 77 are provided in lugs 76 to allow the closure to be inserted into the stop member(s) from above and rotated until the lugs 66 are below stop lugs 76. Non-escape means 78 such as an end closure 79, an "L" shaped member having an opening 79a held in place with a fastener 79b threaded into an opening 79c in body portion 72, are also provided to prevent escape of the closure in the full open position. (See FIGS. 2a and 2b).

An outlet chamber indicated generally at 80 including a flange portion 82 is held in place with fasteners 84 which extend into the mounting flange 18. The juncture of the flange portion 82 with the mounting flange 18 defines a shear plane indicated at 86. The mounting flange contains the conventional unloading spout 88 having a suitable cap therefore 90. The outlet chamber further includes an operating shaft 92 having a lower connection portion 94 extending up through the outlet chamber seal 95 and having an upper non-round engagement portion indicated at 96 adopted to rotate the non-round portion 32 of the operator 30.

It will thus be apparent that when a suitable tool is applied to the non-round portion 94, the shaft 92 will rotate. This in turn rotates the non-round portion 32 and the operator 30. Retainer 24 prevents vertical movement of the operator 30. However, rotation of the operator 30 causes rotation of the depending member 40 by virtue of the threaded engagement 34 and 42. Rotation of the closure occurs and in closed position wiping of the valve seat occurs until closure lugs 66 engage end closures 73 of the stops. Further rotation of the closure 40 is prevented by virtue of engagement of the closure lugs 66 with the end stop closures 73. Further rotation of the operator 30 causes vertical movement of the valve closure 50 from the seated position shown in FIG. 1 to an open position wherein the lugs 66 of the valve closure engage the stops 76 of the stop member(s) 70. A full two (2) inches of movement is provided by locating the stop member(s) 70 within the tank. At the same time, the mounting flange 18 need not extend in excess of one (1) inch below the tank bottom 14. Rotation of the shaft 92 by the connection portion 94 in the opposite direction will cause rotation of the closure until engagement of the lugs 66 with end closures 73 will return the valve closure to the seated position, again with rotation of the valve closure prevented by engagement of the closure lugs 66 with the end closures 73.

In the event of impact to the outlet chamber 80, the outlet chamber will shear along the shear plane 86 and the operator 92 will drop off by virtue of the clearance 98 between non-round portion 96 and non-round portion 32 and/or because of a suitable groove 99 provided in the operating shaft which aligns with the shear plane 86.

The disadvantage of the embodiment illustrated in FIGS. 1 and 2 is that the valve closure 50 including the depending member 52 holding in place the seal 58 and the depending operator 40 must be installed from inside the tank by lowering the closure into the stop assembly 70 and threading the operator 40 into the operator 30 installed from the bottom. This requires two attendants, one inside the car and one outside the car, and is a difficult and awkward operation.

In accordance with another embodiment of the present invention, illustrated in FIGS. 3 and 4, the valve closure 50' is provided with outwardly extending stops or lugs 66' which are located nearer the tank bottom than the stop 66. Stops 66' are located within slots 68' formed in the closure between end closures 65'. Stop members 70' include a base portion 72' welded or cast to mounted flange 18' and including a body portion 74' extending upwardly from flange 18' and inwardly extending stop portions 76' located above closure lug 66'. Operation of the stops to allow limited wiping rotation and then vertical movement without rotation is as disclosed with regard to FIGS. 1 and 2.

However, in accordance with this embodiment, mounting flange 18' is provided with a step slot or contour indicated generally at 100 including a first shoulder portion 102, a second shoulder portion 104 located inwardly and above shoulder 102, and a vertical valve seat slot portion 106. A removable valve seat member 110 is inserted within the slot 100. The valve seat member 110 includes a valve seat portion 112 having a tapered surface 114 to receive the seal 58. The valve seat member 110 further includes a body portion 116 located below the valve seat portion which is adopted during installation to abut the shoulder 104. Valve seat member 110 further includes a flange portion 118 which abuts the shoulder 102 and is provided with countersunk openings 120 adopted to receive countersunk fasteners 122 which extend into the mounting flange 18' to mount the valve seat member within the slot 100.

Additionally circumferentially spaced from the fasteners 122, fasteners 84' are located which extend only into the mounting flange 110 and which mount an outlet chamber 80 constructed in the same manner as outlet chamber 80 in FIGS. 3 and 4.

However, the advantage of the embodiment shown in FIGS. 3 and 4 is that the mounting flange 110, the valve closure 50, depending member 52', seal 58, retainer 24, and operators 30 and 40, may all be assembled on the bench. Then this entire assembly is inserted into the tank 10 from the bottom. Thus it is not necessary for an attendant to enter the tank for the installation and removal operation. Thus this embodiment is preferred over the embodiment shown in FIGS. 1 and 2.

What is claimed is:

1. A tank bottom outlet valve assembly comprising: a tank bottom having a bottom opening therein; a tank mounting flange located within said bottom opening; said mounting flange forming an extension of said tank bottom; fixed stop means mounted upon at least one of said tank bottom and mounting flange, and extending upwardly into said tank; said mounting flange having a flange opening therein; a valve seat separate from said fixed stop means located within said flange opening; a valve closure located within the tank movable vertically relative to said seat, in closed position engaging said valve seat, and in open position being spaced from said valve seat; means for rotating said valve closure located within said flange opening; valve closure stop means on said valve closure located within said tank engagable with said fixed stop means within said tank to prevent rotation of said valve closure and allow vertical movement of said valve closure between open and closed positions.

2. A tank car bottom operable valve assembly according to claim 1, wherein said fixed stop means comprise inwardly extending projections which engage said valve closure to prevent rotation.

3. A tank car bottom operable valve assembly according to claim 1, including open position stop means located within said tank which determine the amount of travel of the valve c-osure between closed and open positions.

4. A tank car bottom operable valve assembly according to claim 3, wherein said fixed stop means and said vertical open position stop means are integral.

5. A tank car bottom operable valve assembly according to claim 4, wherein said fixed stop means and said open position stop means extend inwardly and upwardly from said mounting flange.

6. A tank car bottom operable valve assembly according to claim 4, wherein said fixed stop means comprise inwardly directed projections which said valve closure engages when said closure is in the full open position.

7. A tank car bottom operable valve assembly according to claim 6, wherein said closure stop means comprise outwardly extending closure lugs which engage said projections.

8. A tank car bottom operable valve assembly according to claim 7, wherein said closure lugs define at least one (1) slot which receives said projections.

9. A tank car bottom operable valve assembly according to claim 8, wherein said fixed stop lugs include fixed stop lug openings to install said closure lugs during assembly.

10. A tank car bottom operable valve assembly according to claim 9, wherein non-escape means are provided to prevent removal of said closure lugs after insertion into said fixed stop means.

11. A tank car bottom operable valve assembly according to claim 10, wherein said non-escape means comprise projections extending into at least one (1) of said fixed stop lug openings to prevent removal of said closure.

12. A tank car bottom operable valve assembly according to claim 4, wherein said closure stop means comprise closure projections which engage fixed stop lugs in open position.

13. A tank car bottom operable valve assembly according to claim 1, wherein said valve seat is removable from the bottom and said valve closure is adopted to be assembled upon said valve seat and installed into said tank from the bottom.

14. A tank car bottom operable valve assembly according to claim 1, wherein said closure stop means comprise outwardly extending closure lugs which engage said fixed stop means.

15. A tank car bottom operable valve assembly according to claim 14, wherein said closure lugs define at least one (1) slot which receives said projections.

16. A tank car bottom operable valve assembly according to claim 1, wherein said closure stop means comprise closure projections which engage fixed stop lugs in open position.

17. A tank car bottom operable valve assembly according to claim 1, wherein said closure lugs are spaced from said fixed stop means sufficiently to allow wiping of the valve seat by the valve closure before engagement of the closure lugs and non-rotative stop means to prevent further rotation of the closure.

18. A tank bottom outlet valve assembly comprising: a tank bottom having a bottom opening therein; a tank mounting flange located within said bottom opening; said mounting flange forming an extension of said tank bottom; fixed stop means mounted upon at least one of said tank bottom and mounting flange, and extending upwardly into said tank; said mounting flange having a flange opening therein; a valve seat separate from said fixed stop means located within said flange opening; a valve closure located within the tank movable vertically relative to said seat, in closed position engaging said valve seat, and in open position being spaced from said valve seat; means for rotating said valve closure located within said flange opening; valve closure stop means on said valve closure located within said tank engagable with said fixed stop means within said tank to prevent rotation of said valve closure and allow vertical movement of said valve closure between open and closed positions; an outlet chamber located below said mounting flange; fastening means holding said outlet chamber in engagement with said mounting flange; lower operator extending at least partially through said outlet chamber and engaging an internal operator located within said valve closure and extending within said flange opening; means for maintaining said internal operator spaced from said valve seat and vertically fixed but rotatable; whereby rotation of said lower operator will cause said internal operator to rotate but remain vertically fixed and said valve closure to move vertically without rotation between open and closed positions relative to said seat.

19. A tank car bottom outlet valve assembly according to claim 18, wherein said fixed stop means extend upwardly from said mounting flange.

20. A tank car bottom outlet valve assembly according to claim 18, wherein a shear plane is defined between said outlet chamber and said mounting flange, and whereby if impacted said outlet chamber and said lower operator will shear off along said shear plane.

21. A tank car bottom operable valve assembly according to claim 18, wherein said fixed stop means comprise inwardly extending projections which engage said valve closure stop means to prevent rotation.

22. A tank car bottom operable valve assembly according to claim 21, wherein said closure stop means comprise outwardly extending closure lugs which engage said fixed stop means.

23. A tank car bottom operable valve assembly according to claim 22, wherein said closure lugs define at least one (1) slot and wherein said fixed stop means comprise at least one (1) projection and wherein said slot receives said projections.

24. A tank car bottom operable valve assembly according to claim 18, wherein fixed stop means include open position stop means located within said tank which determine the amount of travel of the valve closure between closed and open positions.

25. A tank car bottom operable valve assembly according to claim 24, wherein said fixed stop means and said open position stop means are integral.

26. A tank car bottom operable valve assembly according to claim 25, wherein said integral fixed stop means and open position stop means extend inwardly and upwardly from said mounting flange.

27. A tank car bottom operable valve assembly according to claim 24, wherein said fixed stop means comprise inwardly directed projections which said valve closure engages when said closure is in the full open position.

28. A tank car bottom operable valve assembly according to claim 27, wherein said closure stop means comprise at least one (1) outwardly extending closure lug which extends into at least one (1) slot formed by said fixed stop means.

29. A tank car bottom operable valve assembly according to claim 27, wherein said fixed stop means include lug openings to install said closure lugs during assembly.

30. A tank car bottom operable valve assembly according to claim 29, wherein non-escape means are provided on said fixed stop means to prevent removal of said closure lugs after insertion into said fixed stop means.

31. A tank car bottom operable valve assembly according to claim 30, wherein said non-escape means comprise projections extending into at least one (1) of said slots to prevent removal of said closure.

32. A tank car bottom operable valve assembly according to claim 31, wherein said closure lugs are spaced from said fixed stop means sufficiently to allow wiping of the valve seat by the valve closure before engagement of the closure lugs and fixed stop means to prevent further rotation of the closure.

33. A tank bottom outlet valve assembly comprising: a tank bottom having a bottom opening therein; a tank mounting flange located within said bottom opening; said mounting flange forming an extension of said tank bottom; fixed stop means mounted upon at least one of said tank bottom and mounting flange, and extending upwardly into said tank; said moutning flange having a flange opening therein; a valve seat separate from said fixed stop means located within said flange opening; a valve closure located within the tank movable vertically relative to said seat, in closed position engaging said valve seat, and in open position being spaced from said valve seat; means for rotating said valve closure located within said flange opening; valve closure stop means on said valve closure located within said tank engagable with said fixed stop means within said tank to prevent rotation of said valve closure and allow vertical movement of said valve closure between open and closed positions; said flange including a lower surface and an upper surface; said mounting flange including a mounting flange slot located below said upper surface; said mounting flange slot including a first slot portion extending upwardly from said flange lower surface to a level intermediate said lower surface and said upper surface; said slot first portion extending radially inwardly to the internal surface of the flange at a level below said upper surface; and a second portion extending vertically along said internal surface to said upper surface; said slot adapted to receive at least a portion of said valve seat member; said valve seat member including an internal valve seat portion adapted to receive said valve closure; said valve seat member having a valve seat opening therein; said valve seat portion located within said second slot portion; a valve seat body portion located below said valve seat portion and supporting said valve seat portion; a valve seat flange portion extending radially outwardly from said valve seat body portion and extending into said slot first portion and including fastening means for holding the valve seat member in place within said mounting flange slot and for supporting said valve closure and any lading in the tank; whereby when said valve closure is rotated by said rotating means and said closure stop means engage said fixed stop means within the tank, said closure moves vertically without rotation and whereby said valve seat and said valve closure are removable from the bottom of the tank by removal of said fastening means without the attendant having to enter the tank.

34. A tank bottom outlet valve assembly comprising: a tank bottonm having a bottom opening therein; a tank mounting flange located within said bottom opening; said mounting flange forming an extension of said tank bottom; fixed stop means mounted upon at least one of said tank bottom and mounting flange, and extending upwardly into said tank; said mounting flange having a flange opening therein; a valve seat separate from said fixed stop means located within said flange opening; a valve closure located within the tank movable vertically relative to said seat, in closed position engaging said valve seat, and in open position being spaced from said valve seat; means for rotating said valve closure located within said flange opening; valve closure stop means on said valve closure located within said tank engagable with said fixed stop means within said tank to prevent rotation of said valve closure and allow vertical movement of said valve closure between open and closed positions; said flange including a lower surface and an upper surface; said mounting flange including a mounting flange slot located below said upper surface; said mounting flange slot including a first slot portion extending upwardly from said flange lower surface to a level intermediate said lower surface and said upper surface; said slot first portion extending radially inwardly to the internal surface of the flange at a level below said upper surface; and a second portion extending vertically along said internal surface to said upper surface; said slot adapted to receive at least a portion of said valve seat member; said valve seat member including an internal valve seat portion adapted to receive said valve closure; said valve seat member having a valve seat opening therein; said valve seat portion located within said second slot portion; a valve seat body portion located below said valve seat portion and supporting said valve seat portion; a valve seat flange portion extending radially outwardly from said valve seat body portion and extending into said slot first portion and including fastening means for holding the valve seat member in place within said mounting flange slot and for supporting said valve closure and any lading in the tank; whereby when said valve closure is rotated by said rotating means and said closure stop means engage said fixed stop means within the tank, said closure moves vertically without rotation and whereby said valve seat and said valve closure are removable from the bottom of the tank by removal of said fastening means without the attendant having to enter the tank; an outlet chamber located below said mounting flange; second fastening means holding said outlet chamber in engagement with said mounting flange; a lower operator extending at least partially through said outlet chamber and engaging an internal operator located within said valve closure and within said valve seat opening; means for maintaining said internal operator spaced from said valve seat and vertically fixed but rotatable; whereby rotation of said lower operator will cause said internal operator to rotate but remain vertically fixed and cause said valve closure to move vertically between open and closed positions relative to seat without rotation during vertical movement; and whereby said outlet chamber is removable from the bottom by removing said second fasteners, and after removal of said outlet chamber, said valve seat and said valve closure are removable from the mounting flange, from the bottom of the tank, by removing said first fasteners without an attendant having to enter the tank.

35. A tank car bottom outlet valve assembly according to claim 34, wherein a shear plane is defined between said outlet chamber and said mounting flange; and whereby if said outlet chamber is impacted said outlet chamber and said lower operator will shear off along said shear plane.

* * * * *